Nov. 30, 1926.

A. J. B. MARSAT

VEHICLE HEADLIGHT

Filed Dec. 23, 1924

Inventor
A.J.B. Marsat
By Marks & Clerk
Attys.

Nov. 30, 1926.

A. J. B. MARSAT 1,608,756

VEHICLE HEADLIGHT

Filed Dec. 23, 1924   3 Sheets-Sheet 2

Inventor
A.J.B. Marsat

Nov. 30, 1926.

A. J. B. MARSAT

VEHICLE HEADLIGHT

Filed Dec. 23, 1924  3 Sheets-Sheet 3

1,608,756

Inventor
A.J.B. Marsat
By Marks Clerk
Attys.

Patented Nov. 30, 1926.

1,608,756

UNITED STATES PATENT OFFICE.

ANTOINE JEAN-BAPTISTE MARSAT, OF VERRIERES-LE-BUISSON, FRANCE.

VEHICLE HEADLIGHT.

Application filed December 23, 1924, Serial No. 757,743, and in France December 29, 1923.

My invention relates to vehicle headlights of the anti-dazzling type comprising in front of the illuminant an optical refracting system. In the usual headlights of this type the said refracting system has a large diameter and is situated at a short distance from the illuminant. Thereby the amount of light falling directly from the illuminant upon the optical system will be considerable and upon issuing therefrom will be very divergent as systems with large diameter have a great spherical aberration and the illuminant not being reduced to a point, its various portions will produce divergent rays.

My invention comprises an optical system of small diameter and long focus; the illuminant is disposed substantially at the focus of the system and is horizontally elongated in a direction perpendicular to the axis of the headlight. The light falling from the illuminant upon the optical system will issue therefrom slightly divergent in the horizontal direction and substantially bounded vertically between two horizontal planes so as to illuminate the road at a certain distance in front of the vehicle.

The light which does not fall directly upon the refracting system may be collected by suitable reflecting systems and then sent upon the refracting system so as to produce when issuing from latter divergent rays directed downwardly which illuminate the road in front of the vehicle. The rays which might be directed upwardly are rendered non-dazzling by reflection on dull surfaces.

Appended drawings show embodiments of my said invention:

Figure 1:
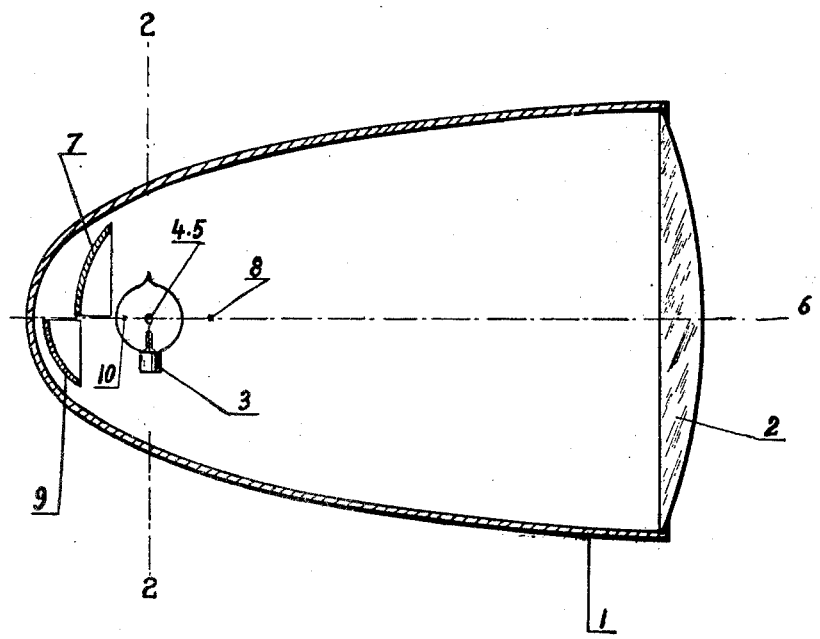
Figs. 1 and 2 are a vertical longitudinal section and a front view of a first embodiment of the invention.
Figure 2:
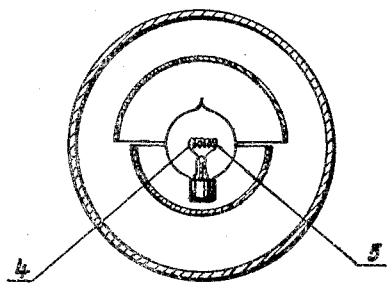
Figure 3:
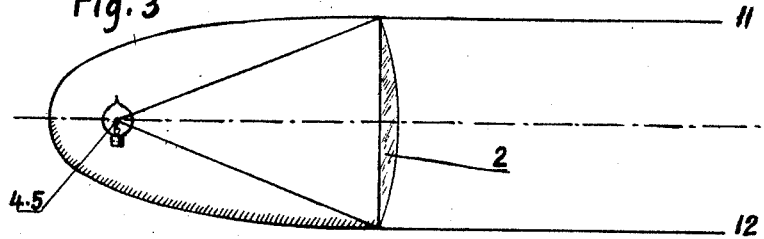
Figs. 3 to 7 are diagrams illustrating the path of the luminous rays in the headlight shown on Fig. 1.
Figure 4:
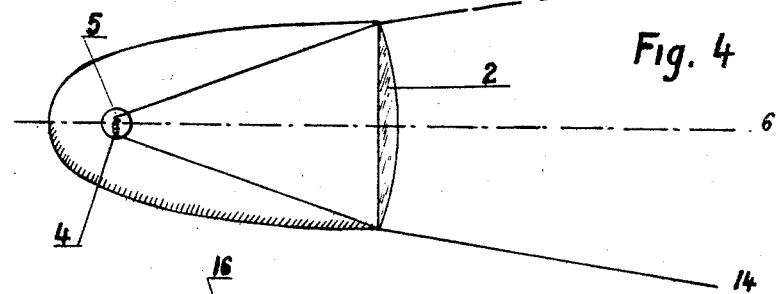
Figure 5:
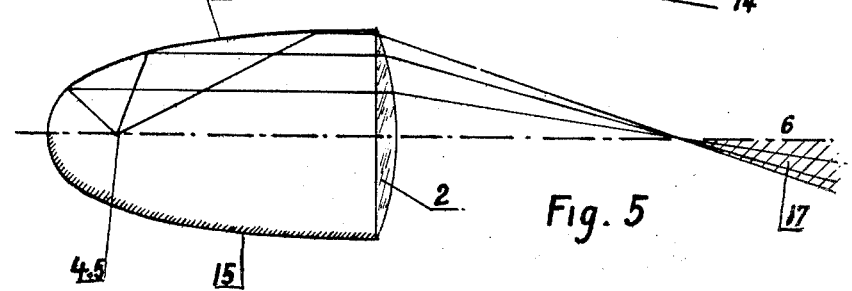
Figure 6:
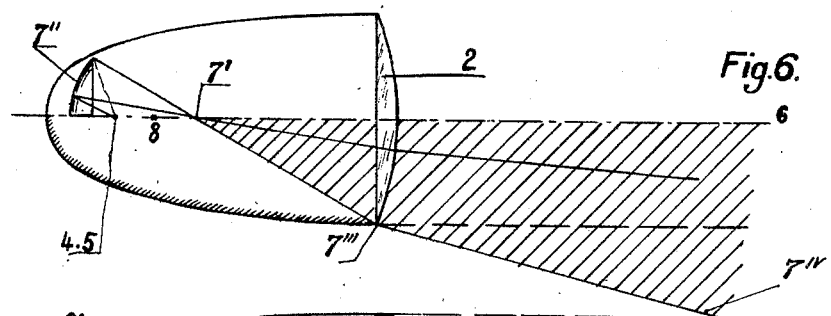
Figure 7:
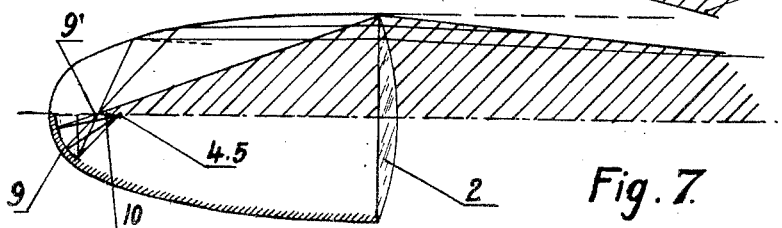

The headlight as shown on Figs. 1 to 7 consists of a metallic body or casing 1 having substantially the form of a much elongated paraboloid. The said casing is provided at the front part with an optical refracting system 2 consisting for example of a plano-convex lens of small diameter and large focal distance, at whose focus is disposed an illuminant 3 consisting of an electric lamp having an elongated filament 4—5 which consists for example of a straight helix disposed horizontally in a direction perpendicular to the axis 6 of the headlight. At the rear of the lamp 3 is disposed an upper spherical half-mirror 7 which is bounded by a horizontal plane passing through the axis 6 and having its center at 8, at the front of the filament 4—5. At the rear of the lamp 3 and at the lower part is disposed another half-spherical mirror 9 which is bounded by the horizontal plane passing through the axis 6 and having its center at 10, in the rear of the filament 4—5.

The light emitted by the filament 4—5 may be decomposed in the following manner:

1. The light which is sent directly upon the optical refracting system 2, Figs. 3 and 4. Since the filament 4—5 is substantially at the focus of the lens 2, the emergent beam is substantially bounded in height by two horizontal planes 11 and 12 and in width (by reason of the dimension of the filament perpendicular to the axis 6) by two slightly diverging planes 13, 14.

The refracting system 2 disposed at the front of the headlight may consist of a single lens or of a double lens. It is a known fact that the lenses of small diameter and long focus have but little aberration, and especially when they are double. One may thus obtain at the exit from the device a powerful beam which is very sharply defined as may be desired.

2. The light which is reflected from the casing of the headlight, Fig. 5. The casing of the headlight consists as above stated of a metallic envelope having substantially the form of a much elongated parabola. The lower part 15 of said casing is either of an absorbent nature, blackened for example in order to entirely arrest the rays falling upon it, or of a diffusing nature, for example a dull surface, so as to reflect only diffused and non-blinding light. The upper part 16 of the headlight casing may consist of the metallic surface itself which is polished, or a deposit of silver, nickel or other white metal is formed upon the said surface. In this event all the rays which are sent by the illuminant 4—5 upon the upper part 16 will be reflected in a direction substantially parallel to the axis 6, and as they are above the same, they will produce at the exit of the lens 2 a beam which is downwardly directed and illuminates the road in front of the motor vehicle. The profile of the casing need not be a parabola, but it will be chosen in all cases so as to distribute the light upon the road in the best manner. The upper surface 16 may also be dull, and it will then send diffused light upon the lens and will itself act as a source of light of large surface; the brilliancy of this surface will vary with its distance from the illuminant, and will thus give to the beam proceeding from the lens a decreasing intensity according as it illuminates the parts of the road which are the nearest, so that the illumination of the ground may be substantially uniform for a considerable distance in front of the vehicle.

3. The light reflected from the upper spherical half-mirror 7 (Fig. 6), whose center 8 is disposed in front of the filament 4—5. This light forms a beam all rays of which pass substantially through the point 7', which is the image of 4—5 in the mirror 7, and the rays in this beam are distributed between a horizontal plane wherein are contained the rays produced by the reflection on the mirror of the horizontal rays issuing from the filament and an inclined plane 7' 7'' wherein are contained the rays produced by the rays issuing from the filament and reflected by the top extremity 7'' of the top spherical mirror. The beam considered after passing through the lense 2 is therefore contained between a horizontal plane substantially coincident with the horizontal plane containing the filament and the plane 7''' 7$^{IV}$ corresponding to the refraction of the rays contained in 7' 7''.

4. The light reflected by the lower spherical half-mirror 9 (Fig. 7) whose center 10 is situated in the rear of the illuminant 4—5. This light will form a beam which passes through the point 9' which is the image of 4—5 in the mirror 9, and will fall upon the upper part of the lens 2, and at its exit will form rays which are downwardly directed exclusively. Those rays which issuing from 9' fall on the top part of the parabolic reflector are redirected towards the top part of lens 2 after passing through which they are directed downwardly.

One may employ either singly or in combination, the reflection from the casing of the headlight and the reflection from the spherical mirrors disposed at the rear.

It will be noted that due to the said arrangements, the beams of light emitted by the headlight will comprise a central part of great intensity which is bounded in height by two slightly divergent planes, and is completed by a series of beams all of which are directed upon the road.

Figure 8:
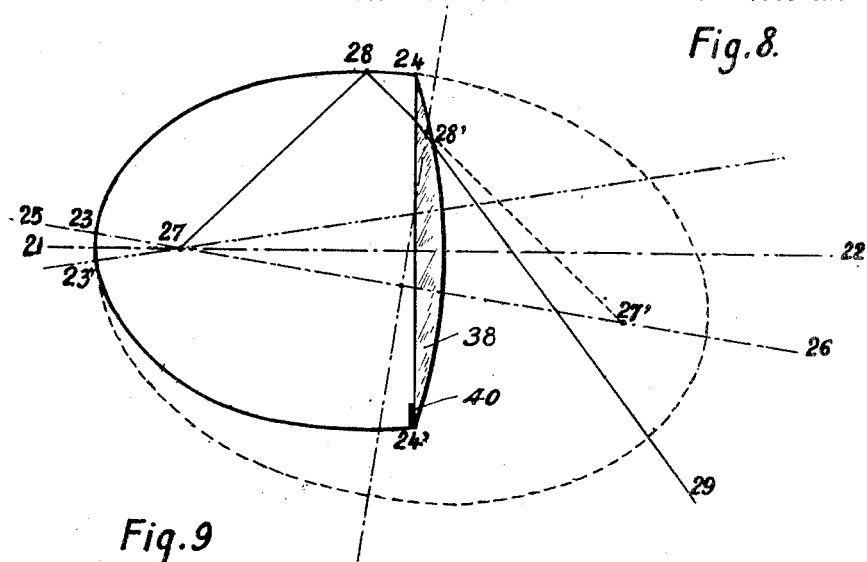
Fig. 8 shows a more practical simpler form of execution.
Figure 9:
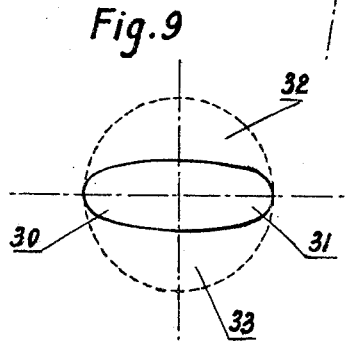
Figs. 9, 10 and 11 are diagrams relating to the path of the luminous rays in the headlight shown on Fig. 8.

In order to provide a headlight casing which offers substantially the advantages inherent in the device comprising the two half-mirrors of the spherical type, I may construct a headlight, Fig. 8, having a surface of revolution which is obtained by rotating on an axis 21—22 an arc of an ellipse 23—24 corresponding to about ¼ of the ellipse, and whose larger axis 25—26 is slightly inclined towards the front below the axis of rotation, the focus 27 being situated upon the said axis. When rotated on the axis 21—22, the curve 23—24 will provide a surface whose lower section in the same vertical plane is 23'—24'. The points 23 and 23' are connected together by a circular arc having its centre at the point 27. This small spherical portion will act in an analogous manner to the above-mentioned additional half-mirrors. The rays such as 27—28 falling upon the upper part will all be reflected substantially in the direction of a point 27' which forms the second focus of the ellipse. When issuing from the lens they will proceed downwardly, as at 28' 29.

According to the said invention, the small spherical portion 23—23' has a brilliant surface. In conformity to what has been above stated, the upper part 23—24 will also have a brilliant surface, whilst the lower part 23'—24' has a dull surface.

Figure 10:
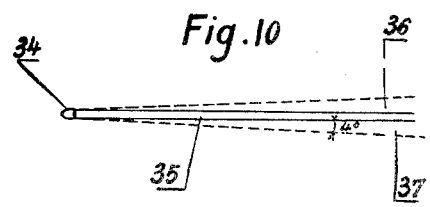

When the beam from a headlight designed upon the preceding principles is sent upon a screen which is perpendicular to the axis, the result will be an elliptical spot of light 30—31 which is horizontally elongated and a less brilliant circular ring 32—33 whose diameter is the large axis of the ellipse 30—31. So that in vertical section, the light emitted by the headlight 34, Fig. 10 will offer a main horizontal beam which is spread out in the horizontal direction, a parasitic beam 36 of semicircular cross section which is upwardly directed, and a parasitic beam 37 of like section which is downwardly directed. The light of the beam 36 might be of a blinding nature, and hence this beam will be pereferably eliminated.

Figure 11:
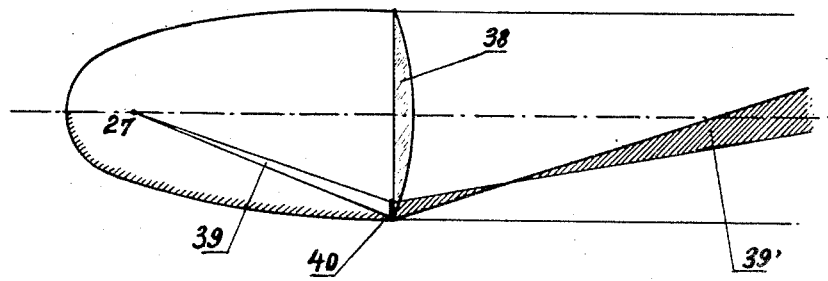

If the headlight, comprises a single lens 38 having some spherical aberration, there are disturbing upwardly directed rays produced as shown clearly on diagram of Fig. 11, the rays 39 issuing from the illuminant 27 and falling upon the lower part of the lens will after traversing the lens produce an upwardly directed beam 39'. In order to eliminate this beam, a small screen 40 is disposed at the lower part of the lens, or this part of the lens is preferably roughened, and this will eliminate the ascending parasitic beam.

Figure 12:
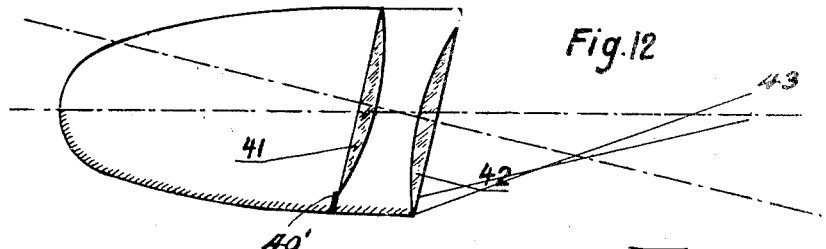
Fig. 12 shows a headlight with a double plane-convex lens the upper part of which is inclined forwardly.

Should the headlight, Fig. 12, comprise a condenser system formed by two plano-convex lenses 41—42, the ascending parasitic beam would be produced by those rays which fall on the lower edge of the lens system. The lower part of the lens system is either roughened or screened, and the top of the said system is forwardly inclined, in view of lowering the issuing rays. The upper parasitic beam 43 is eliminated, since the lower part of the system is prevented through the screen 40' from transmitting any light.

According to my investigations, I find that for a headlight comprising a system formed by two plano-convex lenses of 135 m/m. diameter and about 120 m/m. focal distance measured from the plane face of the lens next the illuminant, an inclination or some 12 degrees will be sufficient to obtain the desired result. Since the illuminant remains upon the horizontal axis passing through the optical centre of the lens system, the main horizontal beam will be substantially unaffected.

What I claim is:

In a headlight chiefly for motor vehicles comprising a main elongated reflecting body and an optical refracting system in front of said body, the combination of a horizontal elongated illuminant at the rear focus of said system and inside the reflecting body, and of two spherical half mirrors disposed behind the illuminant, bounded by the horizontal plane passing through the axis of the headlight, the lower half mirror having its center at the rear of the illuminant and the upper half mirror having its center in front of the illuminant; the lower surface of the main reflecting body being diffusing in front of the illumniant.

In witness whereof I have hereunto set my hand.

ANTOINE JEAN BAPTISTE MARSAT.